US00RE36512E

United States Patent [19]

Sone

[11] E Patent Number: Re. 36,512

[45] **Reissued Date of Patent: *Jan. 18, 2000**

[54] METHOD OF FABRICATING AN ELECTROACOUSTIC TRANSDUCER

[75] Inventor: Takahiro Sone, Shizuoka, Japan

[73] Assignee: Star Micronics Co., Ltd., Shizuoka, Japan

[ * ] Notice: This patent is subject to a terminal disclaimer.

[21] Appl. No.: 09/210,670

[22] Filed: Dec. 14, 1998

Related U.S. Patent Documents

Reissue of:

[64] Patent No.: 5,625,700
Issued: Apr. 29, 1997
Appl. No.: 08/450,350
Filed: May 25, 1995

[51] Int. Cl.[7] ..... H04R 25/00; G08B 3/00

[52] U.S. Cl. ..... 381/396; 381/398; 381/400; 381/412; 340/391.1; 340/388.4; 367/175; 29/594

[58] Field of Search ..... 381/396, 398, 381/400, 412; 340/391.1, 388.4; 367/175; 29/594

[56] References Cited

U.S. PATENT DOCUMENTS

| | | | |
|---|---|---|---|
| 5,287,084 | 2/1994 | Sone | 340/388.4 |
| 5,416,751 | 5/1995 | Imahori et al. | 381/202 |
| 5,467,323 | 11/1995 | Sone | 381/193 |
| 5,528,697 | 6/1996 | Saito | 381/192 |

*Primary Examiner*—Sinh Tran
*Attorney, Agent, or Firm*—Pollock, Vande Sande & Amernick

[57] ABSTRACT

The present invention provides a fabrication method of an electroacoustic transducer capable of simplifying an assembling process on a lead frame and realizing an automatic assembly. The method comprises steps of forming pole piece portions, forming a lead frame having a plurality of base forming areas thereon, each of the areas having lead terminals formed therein, forming bases of a synthetic resin on the lead frame by molding so that the pole piece portions are embedded in the bases, mounting a coil on the pole piece portions embedded in the bases, disposing a support ring and a magnet so as to surround the coil, and placing a diaphragm on the support ring to be held thereby, connecting opposite ends of the coil to the lead terminals, cutting off the lead terminals from the lead frame, putting cases on and fixedly joining the same to the bases, and subjecting the cut lead terminals to a forming process.

13 Claims, 15 Drawing Sheets

METHOD OF FABRICATING AN ELECTROACOUSTIC TRANSDUCER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method of fabricating an electroacoustic transducer for converting electric input signals into sound.

2. Description of the Prior Art

Electroacoustic transducers are employed in various miniature electronic devices, such as card-shaped portable pagers. Miniaturization of electroacoustic transducers to be incorporated into such miniature electronic devices has been requested and efforts have been made for the further miniaturization of the component parts of electroacoustic transducers.

FIGS. 16 and 17 show an example of a conventional electroacoustic transducer. The construction of and a method of fabricating this conventional electroacoustic transducer will be described. A cylindrical upper case 102 and a cylindrical lower case 104 are formed individually of a synthetic resin by molding. A yoke 106 is attached to the lower side of the lower case 104 and a base plate 108 is attached to the lower surface of the yoke 106. A core 110 has a lower end fixedly inserted in a hole formed coaxially through the yoke 106 and the base plate 108 so that the former is caulked by and integrated with the later. A coil 112 which is wound previously around a bobbin, etc. is mounted on the core 110, and an annular magnet 114 is disposed so as to surround the coil 112. Leads 116 and 118 of the coin 112 extend outside from the back side of the base plate 108 and are soldered to electrodes 120 and 122 formed on the base plate 108, respectively. The yoke 106, the core 110 and the magnet 114 form an electromagnetic transducing portion 126 for driving a diaphragm 124.

The lower case 104 has a supporting stepped portion 128 near the upper open end thereof on the inner surface thereof, and a large diameter portion 130 formed at the upper open end of the lower case 104 to form the supporting stepped portion 128. The diaphragm 124 is seated on the supporting stepped portion 128. A circular magnetic piece 132 is attached to the central portion of the diaphragm 124 to increase the vibrating mass of the diaphragm 124.

An engaging portion 134 of the upper case 102 is fitted in the large diameter portion 130 of the lower case 104, and the upper case 102 and the lower case 104 are joined together in an integral unit by joining means, such as ultrasonic welding. Thus, a resonance space 136 that resonates with the vibration of the diaphragm 124 is formed in the upper case 102 to produce an appropriate sound pressure. A sound emitting cylinder 140 coaxially having a through hole 138 projects into the resonance space 136 from the inner surface of the top wall of the upper case 102.

This electroacoustic transducer has a basic construction for converting electric input signals into sound and comprises a comparatively large number of independent component parts. Accordingly, the electroacoustic transducer must be assembled very carefully which obstructs an automatic assembly thereof because the characteristics of the electroacoustic transducer including a sound output characteristic are greatly dependent on the accuracy of alignment of the component parts, particularly that of alignment of the diaphragm 124 and the magnet 114.

In assembly of component parts of such an electroacoustic transducer, when the component parts are mounted on the lower case 104, such mounting is carried out in a state where the lower case 104 is positioned as illustrated in FIG. 16, namely, the open end thereof is directed upward, and also such mounting is carried out in a state where the lower case 104 is reversed, namely, the open end thereof is directed downward. That is, the lower case 104 need be reversed in each step in such a way that firstly the yoke 106 and the base plate 108 are attached to the lower case 104, secondly the magnet 114 is attached to the lower case 104 while the lower case 104 is reversed. Thirdly the adhesive is applied to the attached portions of the yoke 106, the base plate 108 and the magnet 114 while the lower case 104 is again reversed, fourthly the diaphragm 124 is seated on the lower case 104 and the upper case 102 is fitted in the lower case 104 while the lower case 104 is further reversed, and finally the upper case 102 and the lower case 104 are joined together by the ultrasonic welding. Such a mechanical reversal of the lower case enhances accuracy of assembly and accomplishes uniform quality. However, this makes the makes process jigs and process steps complex.

SUMMARY OF THE INVENTION

Accordingly, it is an object of the present invention to provide a method of fabricating an electroacoustic transducer capable of simplifying an assembling step on a lead frame and realizing an automatic assembling work. The method comprises steps of forming pole piece portions (4), forming a lead frame (40) having a plurality of base forming areas thereon, each of the areas having lead terminals (2A, 2B, 2C, 2D) formed therein, forming bases (8) of a synthetic resin on the lead frame (40) by molding so that the pole piece portions (4) are embedded in the bases (8), mounting a coil (10) on the pole piece portions (4) embedded in the bases (8), disposing a support ring (20) and a magnet (12) so as to surround the coil (10), and placing a diaphragm (24) on the support ring (20) to be held thereby, connecting opposite ends (28, 30) of the coil (10) to the lead terminals (2A, 2B, 2C, 2D), cutting off the lead terminals (2A, 2B, 2C, 2D) from the lead frame (40), putting cases (32) on and fixedly joining the same to the bases (8), and subjecting the cut lead terminals (2A, 2B, 2C, 2D) to a forming process.

In the method of fabricating the electroacoustic transducer, the lead terminals may be cut off from the lead frame to be subjected to a forming process after the cases are put on and fixedly joined to the bases on the lead frame.

Further, in the method of fabricating the electroacoustic transducer, the coil may be formed as an individual air-core coil in an additional step or directly winding a wire around a pole portion or core of the pole piece portion embedded in the base on the lead frame.

A magnet (120) may be integrated with the support ring (20) so that the support ring (20) and the magnet (12) constitute a single component.

Still further, in the method of fabricating the electroacoustic transducer, the pole piece portion is provided with a yoke and a core wherein the yoke and the core are integrally formed as a single component or they are formed separately and then integrated with each other.

A plurality of areas for forming electroacoustic transducer bases thereon are provided on the lead frame, and lead terminals required by the electroacoustic transducers are formed with respect to each area. Bases are formed of a synthetic resin on the lead frame by molding and each pole piece portion is embedded in each base in the molding process. After each coil is mounted on each pole piece portion, the support ring and the magnet is disposed so as to surround the coil and a diaphragm is placed on each support ring to be held thereby. The support rings hold the diaphragms by a magnetic force of the magnets. Opposite ends of each coil are connected to each pair of lead terminals. The lead terminals are cut off from the lead frame and the cases are put on and fixedly joined to the bases. The cut lead terminals are subjected to the forming process to complete the electroacoustic transducers.

In the method of fabricating the electroacoustic transducer, joining of the cases to the bases may be carried out on the lead frame. In this case, the cases are put on and fixedly joined to the bases on the lead frame before the lead terminals are cut off from the lead frame. Thereafter, the lead terminals are cut off from the lead frame to be subjected to the forming process to complete the electroacoustic transducer. That is, in such a fabricating method, a continuous operation of assembling process can be performed on the lead frame.

Further, in case the method of fabricating the electroacoustic transducer employs a coil formed by winding a wire as an individual air-core coil in advance, such a coil may be merely mounted on a pole portion or core of the pole piece portion on the lead frame, which reduces an assembling time. Still further, when the coil is wound around the pole portion or core of the pole piece portion on the lead frame, the coil can be formed on the lead frame so that the continuous operation of the assembling process including the winding process of the coil can be realized.

Still more further, as shown in FIG. 15, if the magnet is formed in the shape of the support ring, the support ring can be made of the magnet. That is, the support ring and the magnet can integrally constitute a single component, which reduces the number of components and dimensional error caused by two components.

The above and other objects, features and advantages of the present invention will become more apparent from the following description taken in connection with the accompanying drawings.

DETAILED DESCRIPTION OF THE PREFERRED EMBODIMENTS

The present invention will be described in detail now with reference to the attached drawings.

Figure 1:
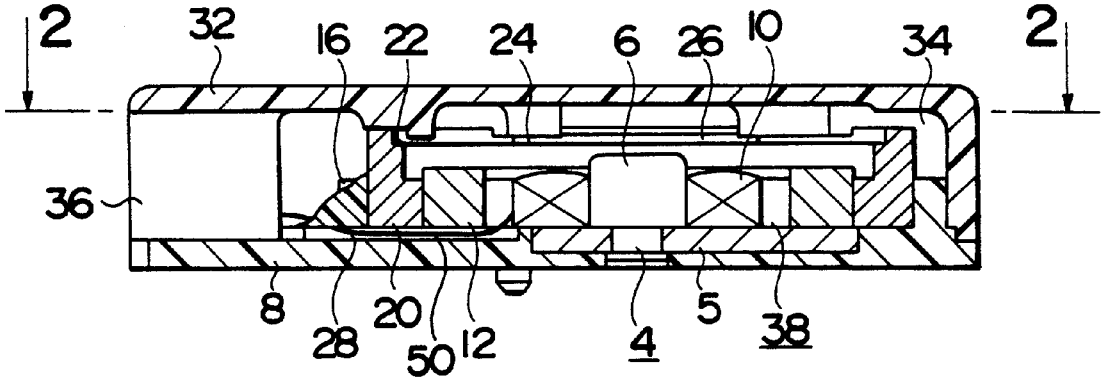
FIG. 1 is a longitudinal sectional view of an electroacoustic transducer fabricated by a method of fabrication in accordance with a first embodiment according to the present invention.
Figure 2:
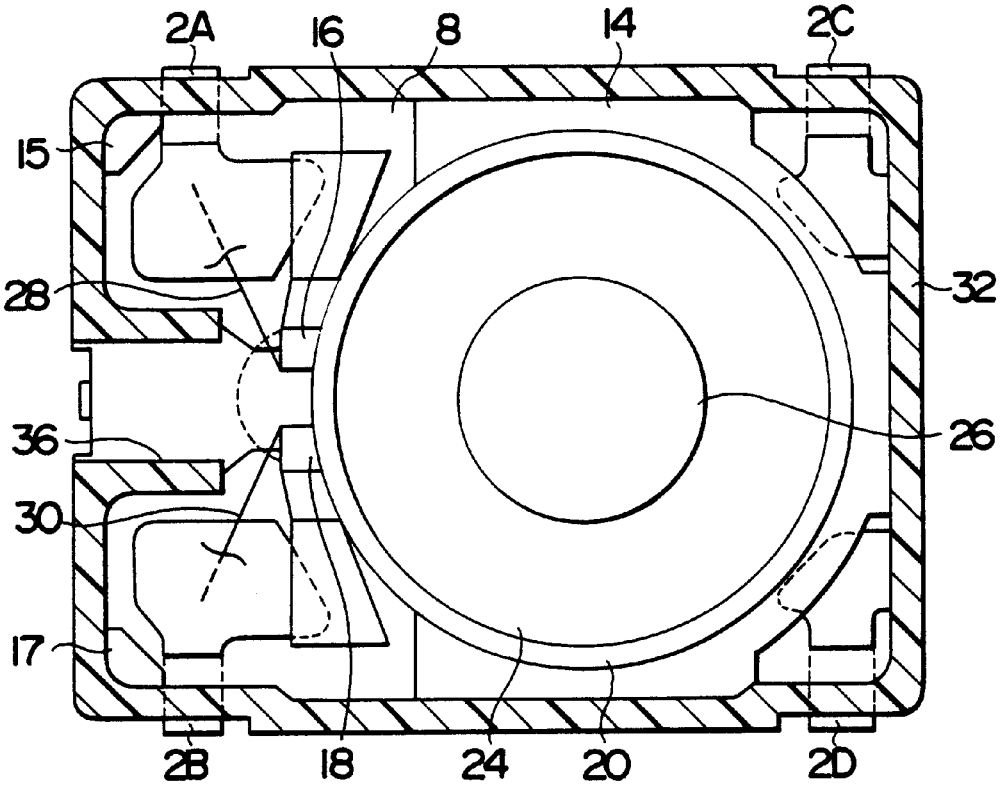
FIG. 2 is a sectional plan view taken on line 2—2 in FIG. 1.

FIGS. 1 and 2 show an electroacoustic transducer fabricated in accordance with a first embodiment of the present invention. Lead terminals 2A, 2B, 2C and 2D are integrally formed of a lead frame 40. A pole piece portion 4 consists of a plate-shaped yoke 5 and a core 6 attached to the yoke 5. The lead terminals 2A, 2B, 2C and 2D and the pole piece portion 4 are embedded in a base 8 formed of a synthetic resin in the shape of a rectangular flat plate.

A coil 10 is wound around the core 6, and an annular magnet 12 is disposed so as to surround the coil 10. The magnet 12 and the pole piece portion 4 are magnetically coupled to form a magnetic path. The coil 10 formed of an air-core one is mounted on the core 6 or directly wound around the core 6.

The base 8 is provided on its upper surface with positioning protrusions 14, 15, 16, 17 and 18. A support ring 20 is positioned inside the positioning protrusions 14, 16 and 18 on the base 8. The support ring 20 has a stepped portion 22 on its inner surface at a position near the upper end thereof, and a diaphragm 24 is seated on the stepped portion 22 of the support ring 20. A magnetic piece 26 is attached to the central portion of the diaphragm 24 to increase the vibrating mass of the diaphragm 24.

Opposite ends 28 and 30 of the coil 10 are pulled outside along the lower surface of the magnet 12 and via a space between the positioning protrusions 16 and 18, and soldered to the lead terminals 2A and 2B, respectively.

A case 32 is positioned in place on the base 8 by the positioning protrusions 14, 15 and 17, and the case 32 is fixed to the base 8 by a fixing means, such as ultrasonic welding. The case 32 formed of synthetic resin defines a resonance space 34 extending over the surface of the diaphragm 24 and around the support ring 20. The case 32 is provided on one side wall thereof with a sound emitting cylinder 36 by means of which the resonance space 34 communicates with the atmosphere.

In such an electroacoustic transducer, the pole piece portion 4 having the core 6 and combined with the base 8 by insert molding, the coil 10 and the magnet 12 constitute an electromagnetic transducing portion 38. When an ac signal is applied across the lead terminals 2A and 2B, the coil 10 is excited and creates an alternating magnetic field between the core 6 and the diaphragm 24 provided with the magnetic piece 26. Consequently, the diaphragm 24 vibrates to generate sound, the resonant space 34 resonates and the sound is radiated outside the case 32 through the sound emitting cylinder 36. The resonation of the resonant space 34 causes the base 8 and the case 32 to vibrate and generate sounds.

Since the lead terminals 2A and 2B are famed of the lead frame, the electracoustic transducer comprises a comparatively small number of component parts, can be efficiently assembled by a reduced number of assembling steps, and can be formed in a flat compact construction. The support ring 20 is formed of a metal, such as brass, separately from the base 8, which enhances the accuracy of the support ring 20, moderates demand for the molding accuracy of the base 8, and improves the yield of the electroacoustic transducer fabricating process.

The method of fabricating the electroacoustic transducer will be described in sequential fabricating steps with reference to FIGS. 3 to 14.

a. L Lead Frame Forming Step

Figure 3:
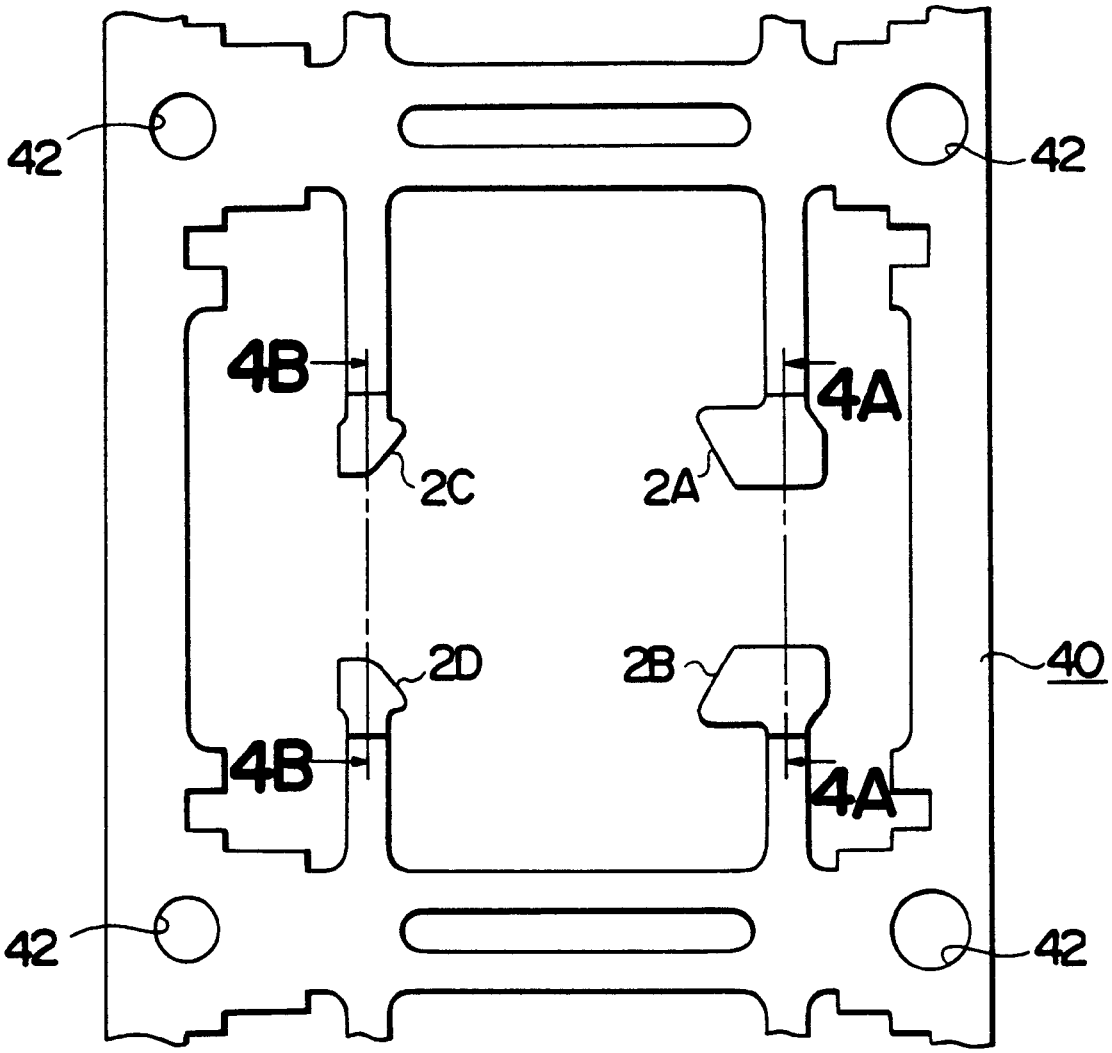
FIG. 3 is a fragmentary plan view of a lead frame employed in fabricating the electroacoustic transducer of FIG. 1.
Figure 4A:
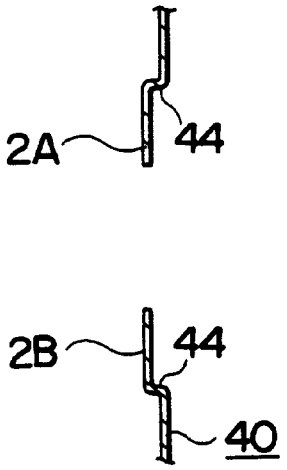
FIG. 4A is a sectional view taken on line 4A—4A in FIG. 3.
Figure 4B:
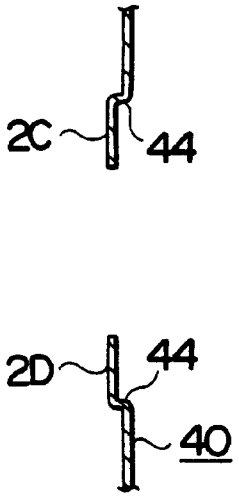
FIG. 4B is a sectional view taken on line 4B—4B in FIG. 3.

Referring to FIG. 3 showing an example of the lead frame 40, the lead frame 40 is formed like a strip and is coated with solder. The lead frame 40 has opposite side bars provided with locating holes 42. As shown in FIGS. 4A and 4B, the lead terminals 2A, 2B, 2C and 2D are formed so as to slightly protrude by a step 44 from a plane including the side bars. The lead frame 40 as shown in FIG. 3 need not be formed by a single forming cycle but may be formed by a plurality of forming cycles in which the lead frame 40 is located by means of the locating holes 42.

b. Pole Piece Portion Forming Step

Figure 5A:
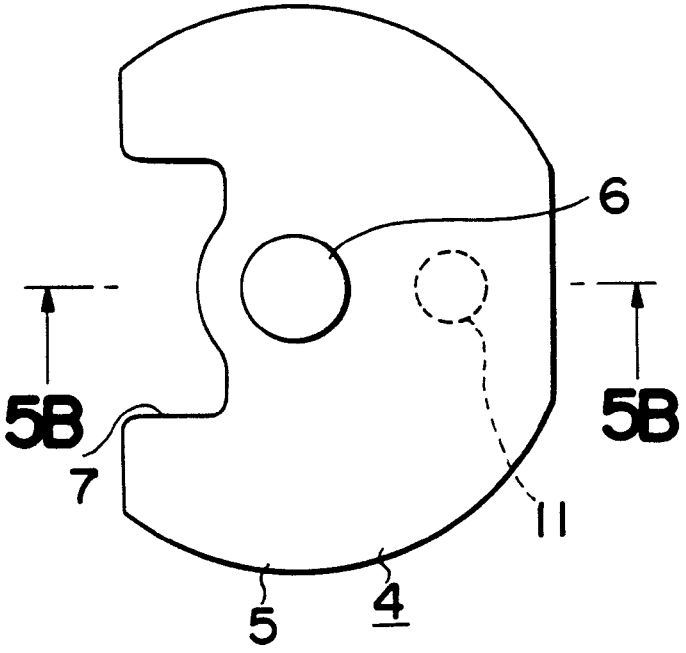
FIG. 5A is a plan view of a pole piece portion.
Figure 5B:
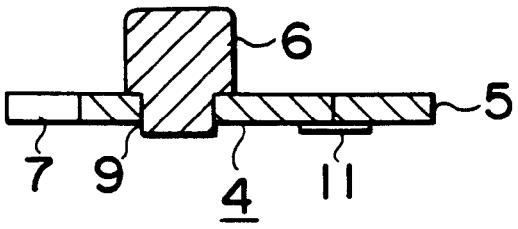
FIG. 5B is a sectional view taken on line 5B—5B in FIG. 5A.

Referring to FIG. 5 showing an example of the pole piece portion 4, the pole piece portion 4 consists of the yoke 5 having a notched portion 7 on a circular material and the core 6 attached to the yoke 5 by caulking the core 6 by the yoke 5. The core 6 is columnar and is small in diameter at its press fit portion 9. A circular protrusion 11 is formed on the lower surface of the yoke 5.

c. Base Forming Step

Figure 6:
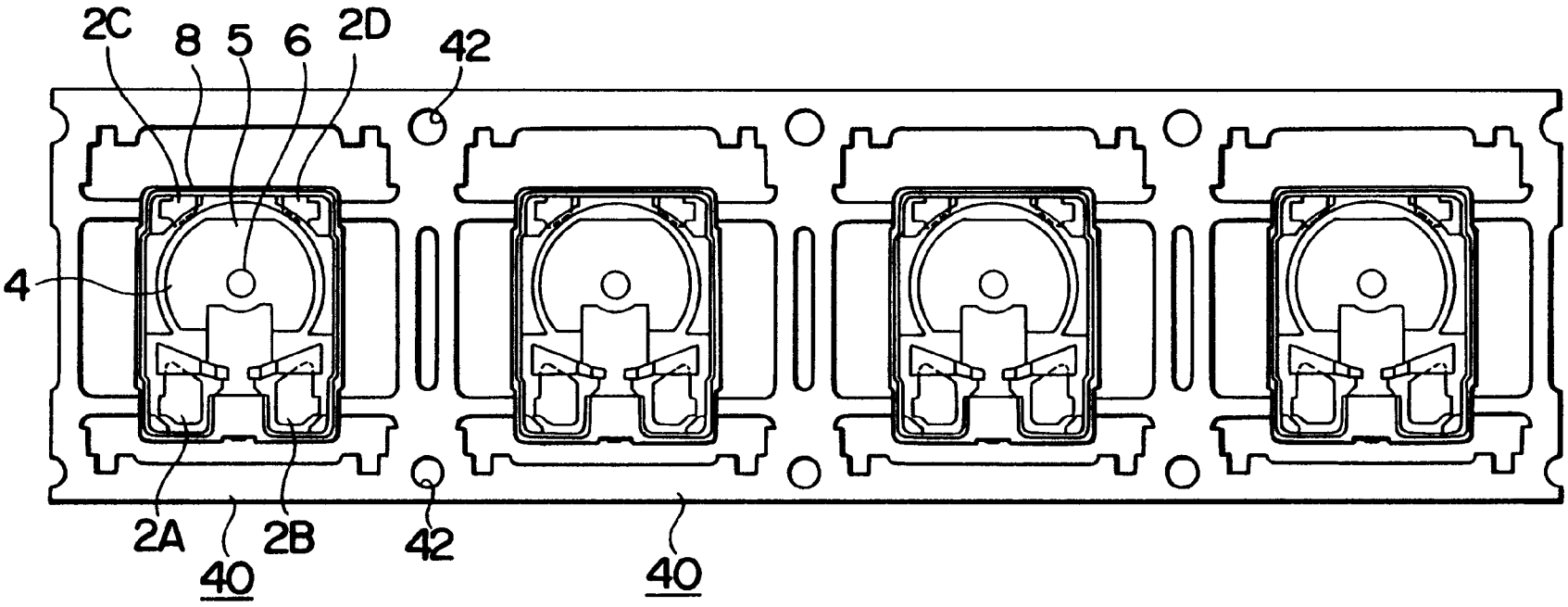
FIG. 6 is a plan view of the partially fabricated electroacoustic transducers of FIG. 1 in a step of forming bases on the lead frame of FIG. 3.
Figure 7:
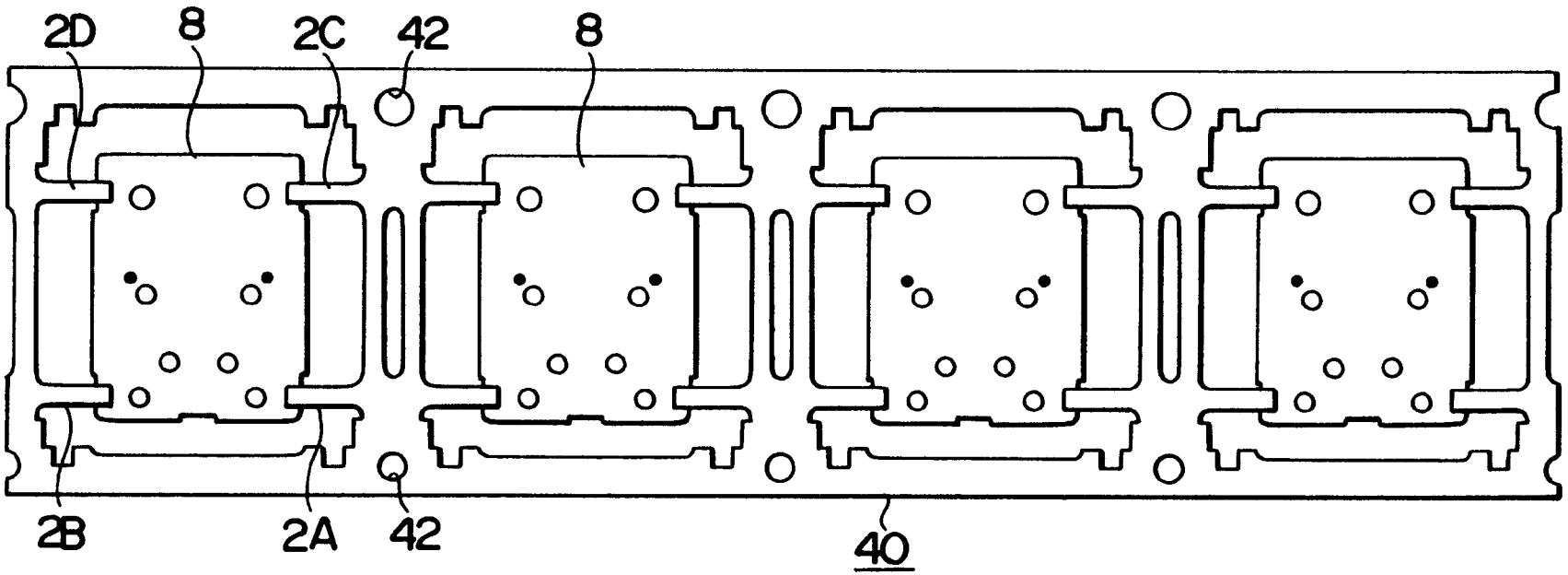
FIG. 7 is a rear view of the partially fabricated electroacoustic transducers of FIG. 1 in a step of forming bases on die lead fame of FIG. 3.
Figure 8:
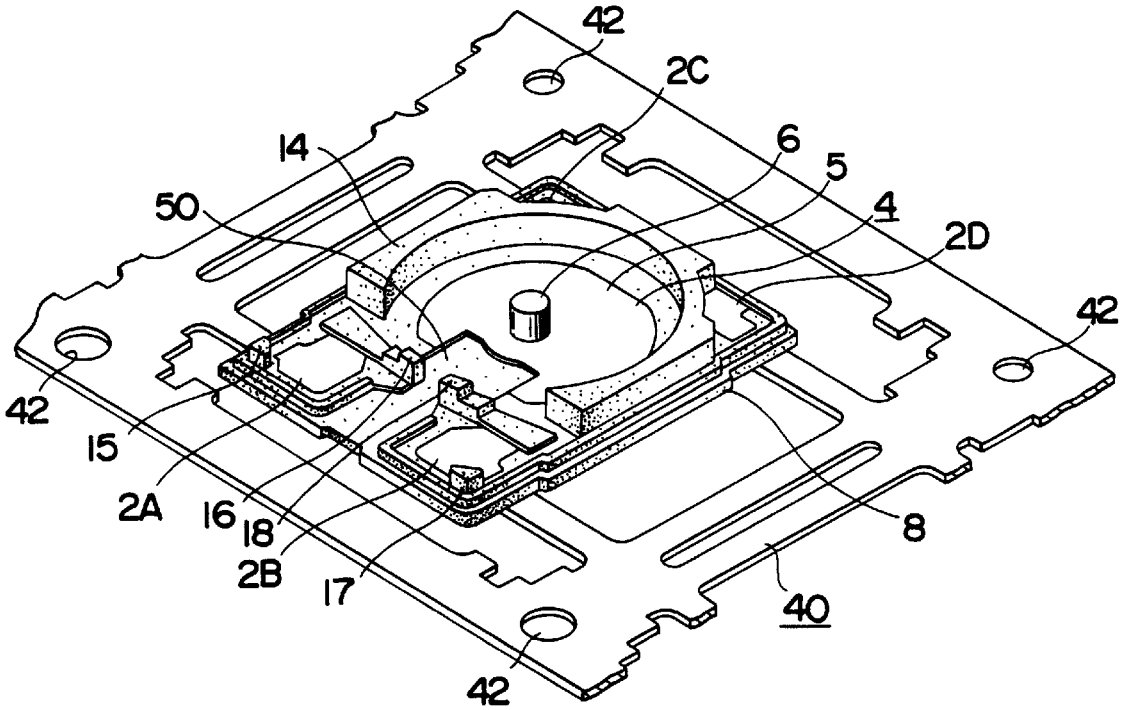
FIG. 8 is a perspective view of the partially fabricated electroacoustic transducer of FIG. 1 upon completion of a step of forming the base on the lead frame of FIG. 3.

Referring to FIGS. 6, 7 and 8 showing a molding process of the bases 8 on the lead frame 40, a plurality of bases 8 are feed of synthetic resin on the lead frame 40 by molding. FIGS. 6 and 8 show the top side of the lead frame, and FIG. 7 shows the rear side. In the molding, the lead frame 40 and the pole piece portions 4 are held in a mold, and a molten synthetic resin is poured into the mold to form the bases 8 over the pole piece portion 4 and the lead terminals 2A, 2B, 2C and 2D so that the upper surface of the pole piece portion 4, and the upper portions of the lead terminals 2A, 2B, 2C and 2D to be subjected to soldering are exposed on the bases 8.

d. Support Ring, Magnet and Diaphragm Mounting Step

Figure 9:
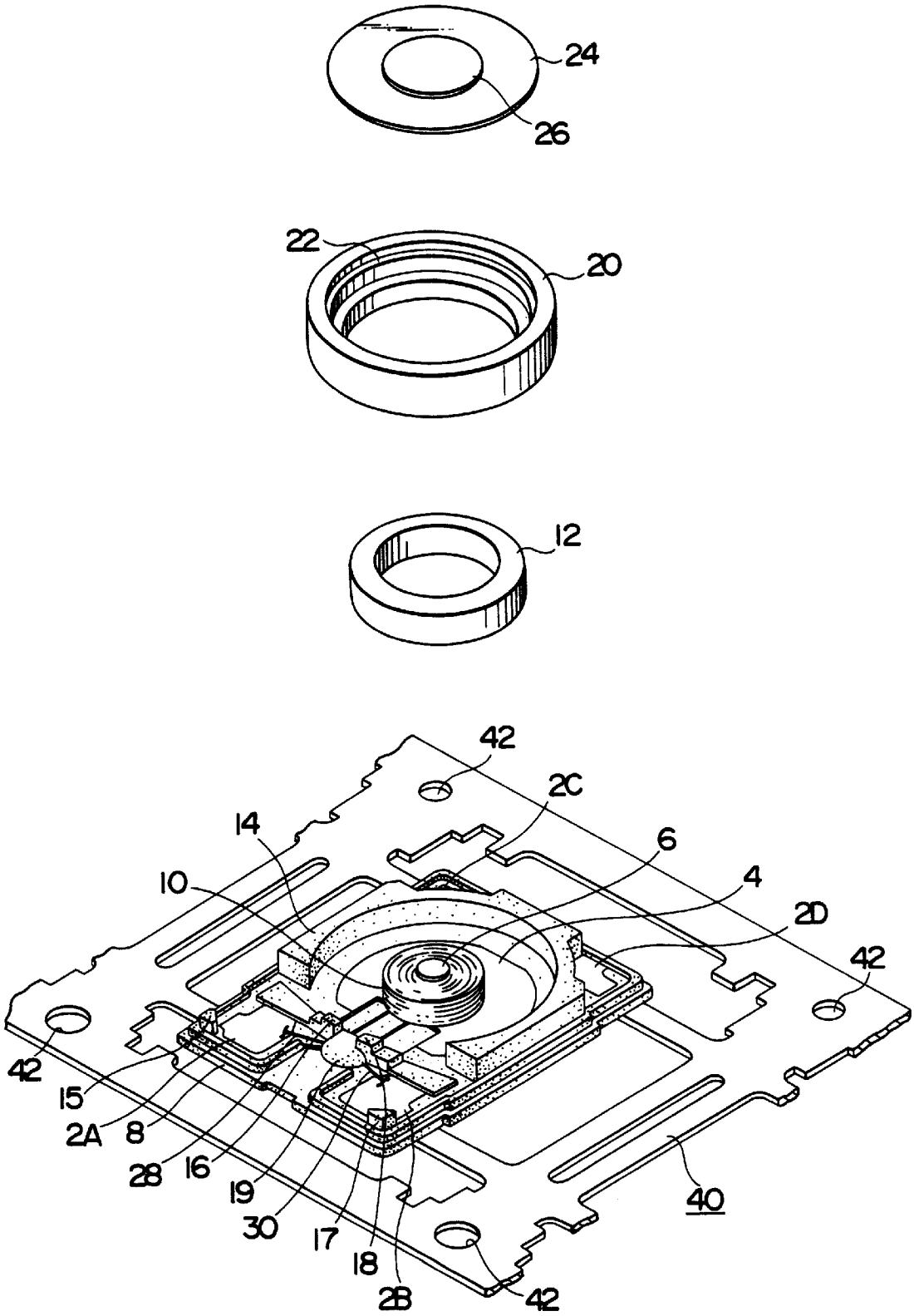
FIG. 9 is an exploded perspective view of the partially fabricated electroacoustic transducer of FIG. 1 in a step of mounting a magnet, a support ring and a diaphragm on the base formed on the lead frame of FIG. 3.

Referring to FIG. 9, after the coil 10 is mounted on the core 6 of the pole piece portion 4 embedded in the bases 8 on the lead frame 40 while the support ring 20, the magnet 12 and the diaphragm 24 are formed in advance, the support ring 20 is fitted in a space of the base 8 and is attached adhesively to the base 8. The magnet 12 is fitted in the support ring 20, and then the diaphragm 24 is placed on the support ring 20.

e. Coil Ends Processing Step

Figure 10:
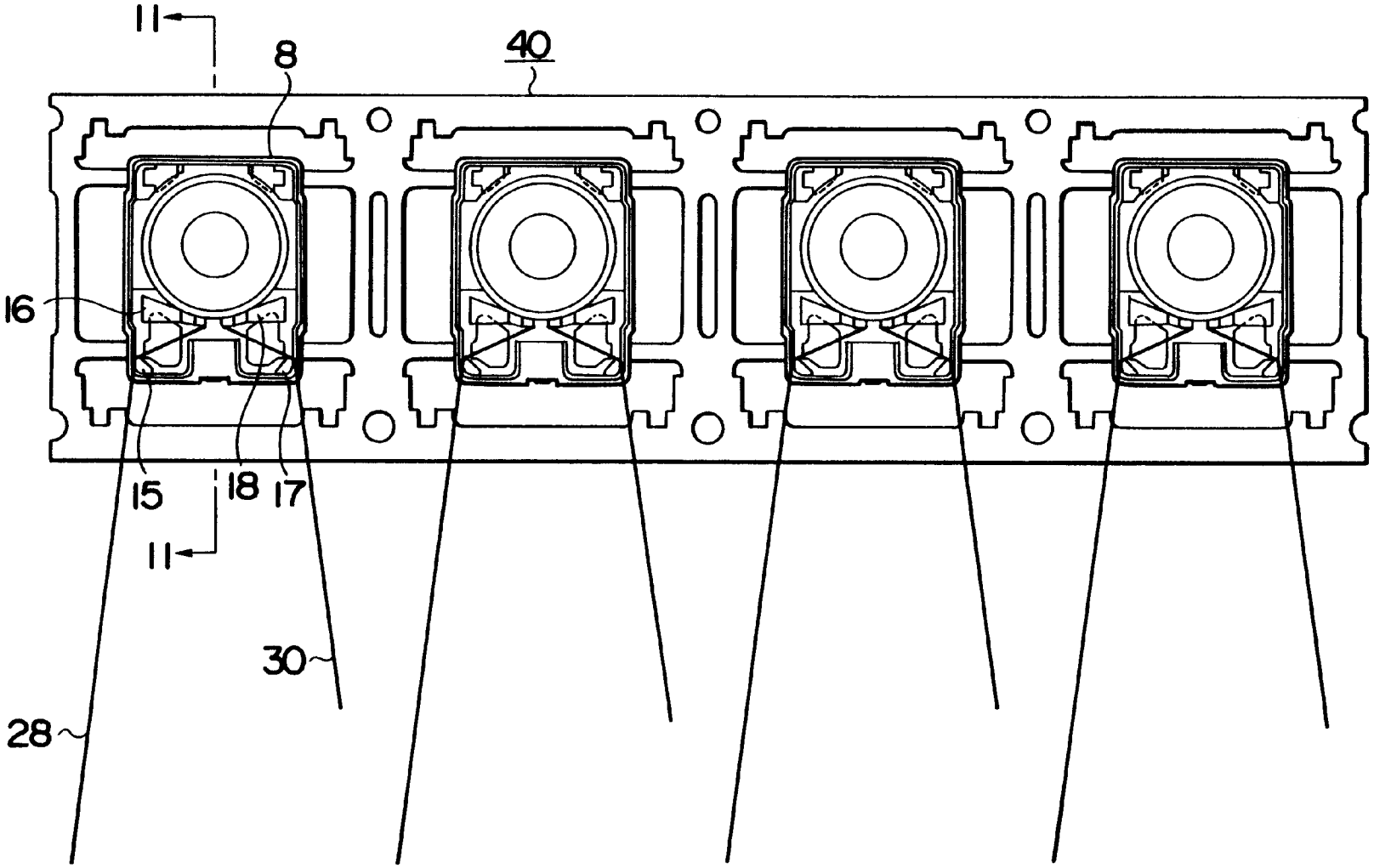
FIG. 10 is a plan view of the partially fabricated electroacoustic transducers of FIG. 1 after a step of mounting a magnet, a support ring and a diaphragm on the bases formed on the lead frame of FIG. 3.
Figure 11:
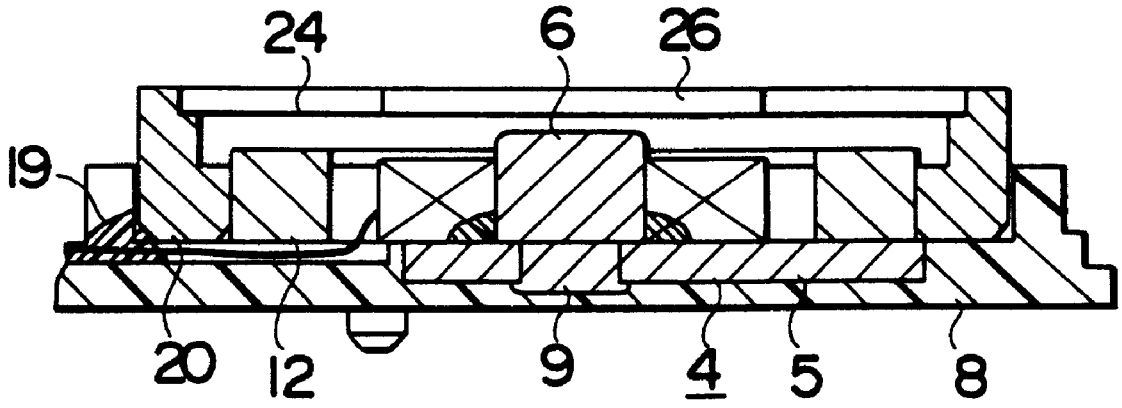
FIG. 11 is a cross-sectional view of the partially fabricated electroacoustic transducer of FIG. 10 taken on lines 11—11 in FIG. 10 during a step of assembling the magnet, the support ring and the diaphragm on the base.

As shown in FIG. 10, opposite ends 28 and 30 of each coil 10 mounted on the core 6 of the pole piece portion 4 are pulled outside via the space between the positioning protrusions 16 and 18, and then caught by protrusions 15 and 17 so that they are extended in the direction perpendicular to the lead frame 40 and held under an appropriate tension, and finally they are soldered to the terminals 2A and 2B, respectively. When an adhesive means, e.g. silicon adhesive is applied to a gap defined between the protrusions 16 and 18, the opposite ends 28 and 30 of the coil 10 are protected and a groove 50 (FIGS. 1 and 8) is sealed. FIG. 11 is a cross-sectional view taken on lines 11—11 in FIG. 10, showing a state of completion of processing of the opposite ends 28 and 30 of the coil 10.

f. Case Joining Step

Figure 12:
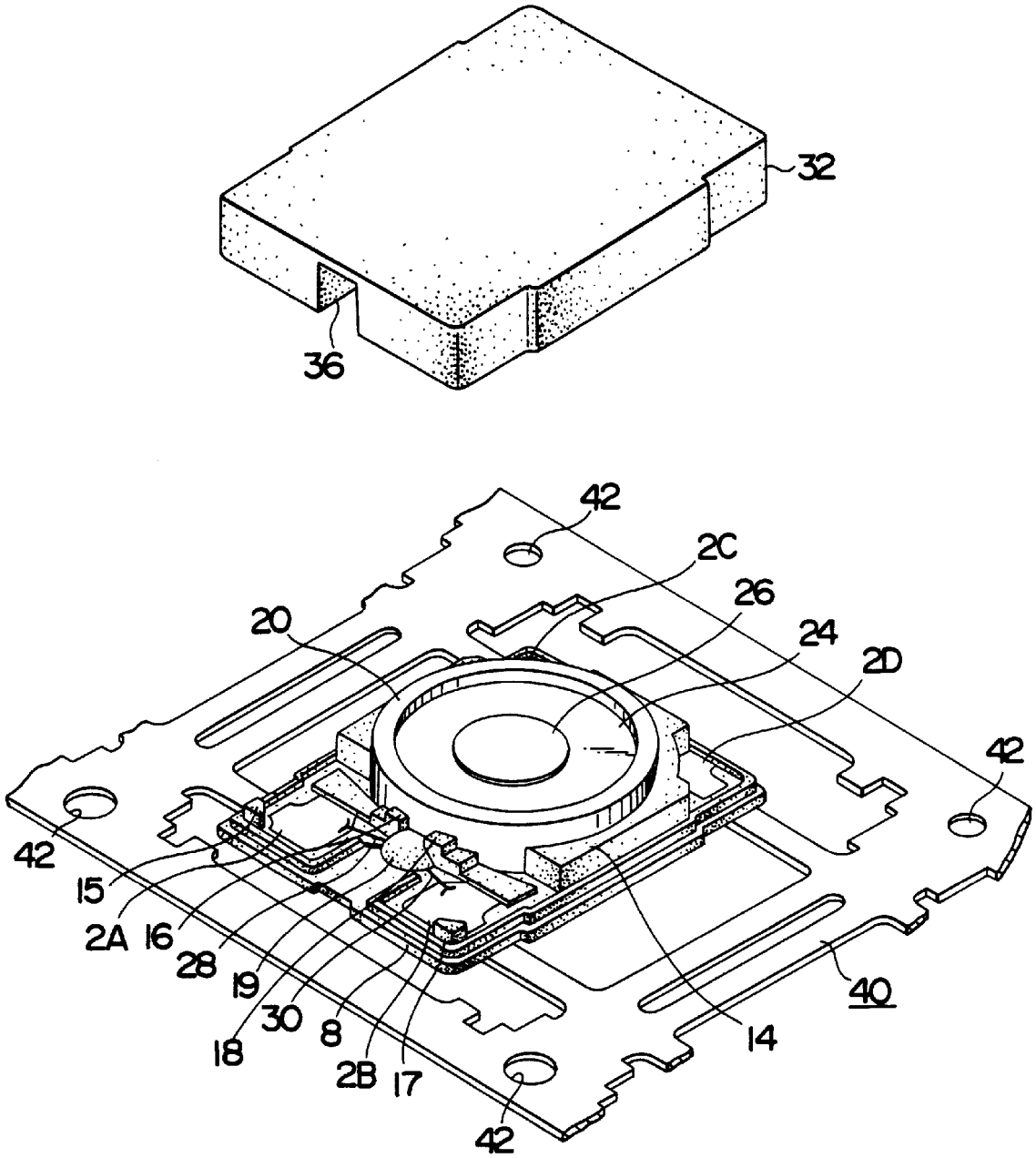
FIG. 12 is a perspective view of the partially fabricated electroacoustic transducer of FIG. 1 in a step of mounting a case on the base formed on the lead frame of FIG. 3.
Figure 13:
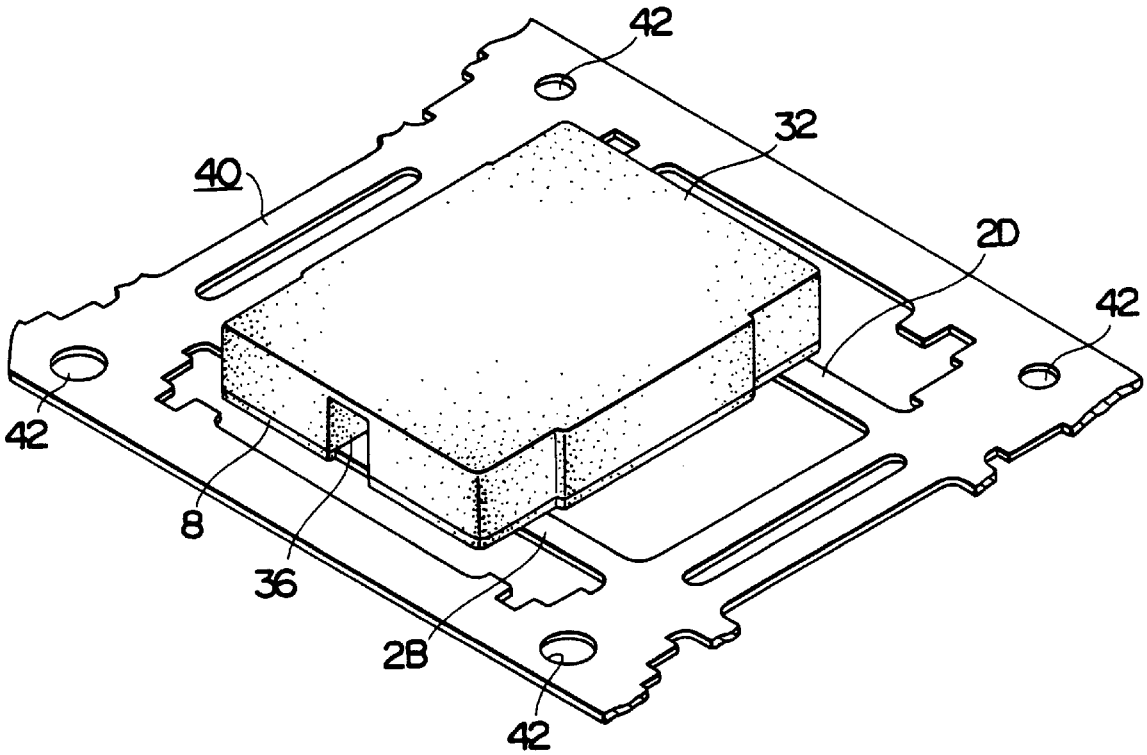
FIG. 13 is a perspective view of the electroacoustic transducer of FIG. 1 formed on the lead frame of FIG. 3.

The case 32 is formed of a synthetic resin by molding and it is disposed on the base 8 formed on the lead frame 40 as shown in FIG. 12. As shown in FIG. 13, the base 8 and the case 32 are jointed to each other by ultrasonic welding. The case 32 may be attached adhesively to the base 8 with an adhesive. With such a joining step, a plurality of such electroacoustic transducers are assembled on the lead frame 40.

g. Lead Frame Cutting Step

Figure 14:
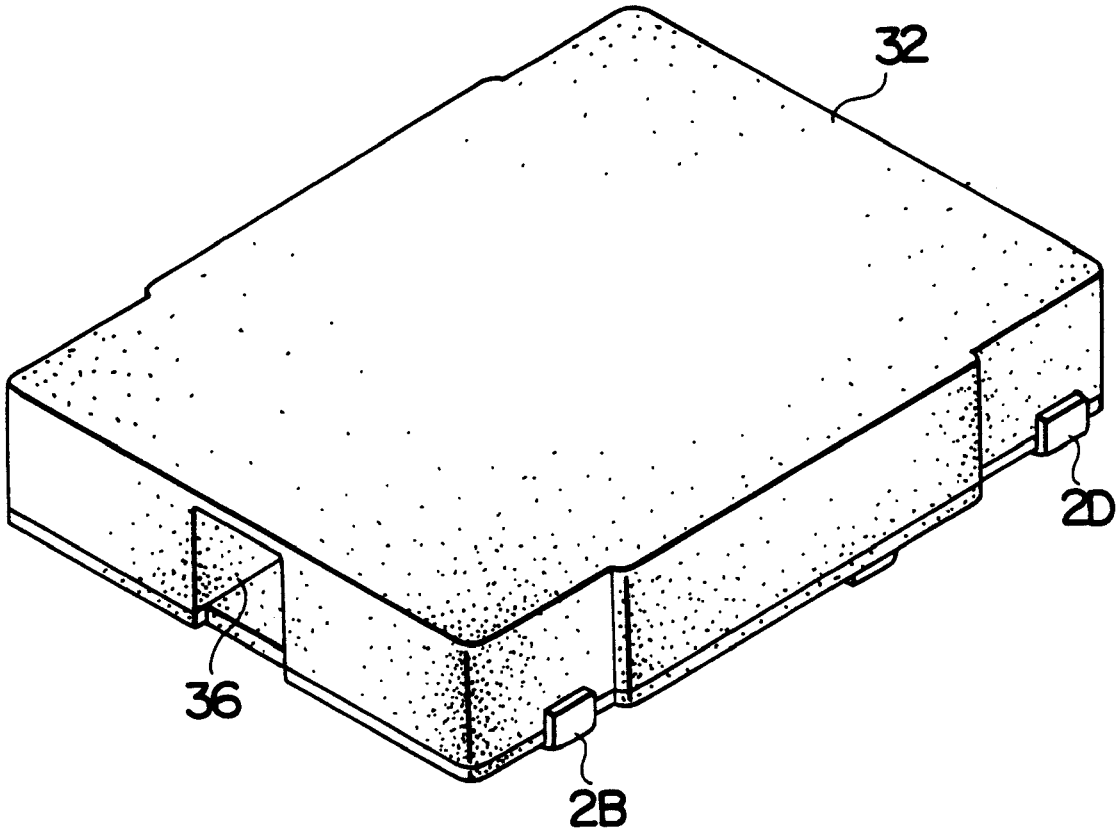
FIG. 14 is a perspective view of the electroacoustic transducer of FIG. 1 cut off from the lead frame of FIG. 3.

After the lead terminals 2A, 2B, 2C and 2D are cut off from the lead frame 40, the lead terminals 2A, 2B, 2C and 2D are subjected to a forming process as shown in FIG. 14 to complete the electroacoustic transducer.

Since the lead terminals 2A to 2D are integrally molded on the lead fame 40 and the base 8 is also molded to embed the pole piece portion 4 therein, the number of component parts that need to be assembled can be reduced. Further, since all the processes can be carried out on the lead frame 40, it is not necessary to reverse the lower case every assembling step which has been made in the conventional method of fabricating the electroacoustic transducer, and hence the electroacoustic transducer can be easily assembled by simple assembling work.

Although the core 6 is mounted on the coil 10 in the first embodiment, the coil 10 can be directly wound around the core 6.

Figure 15:
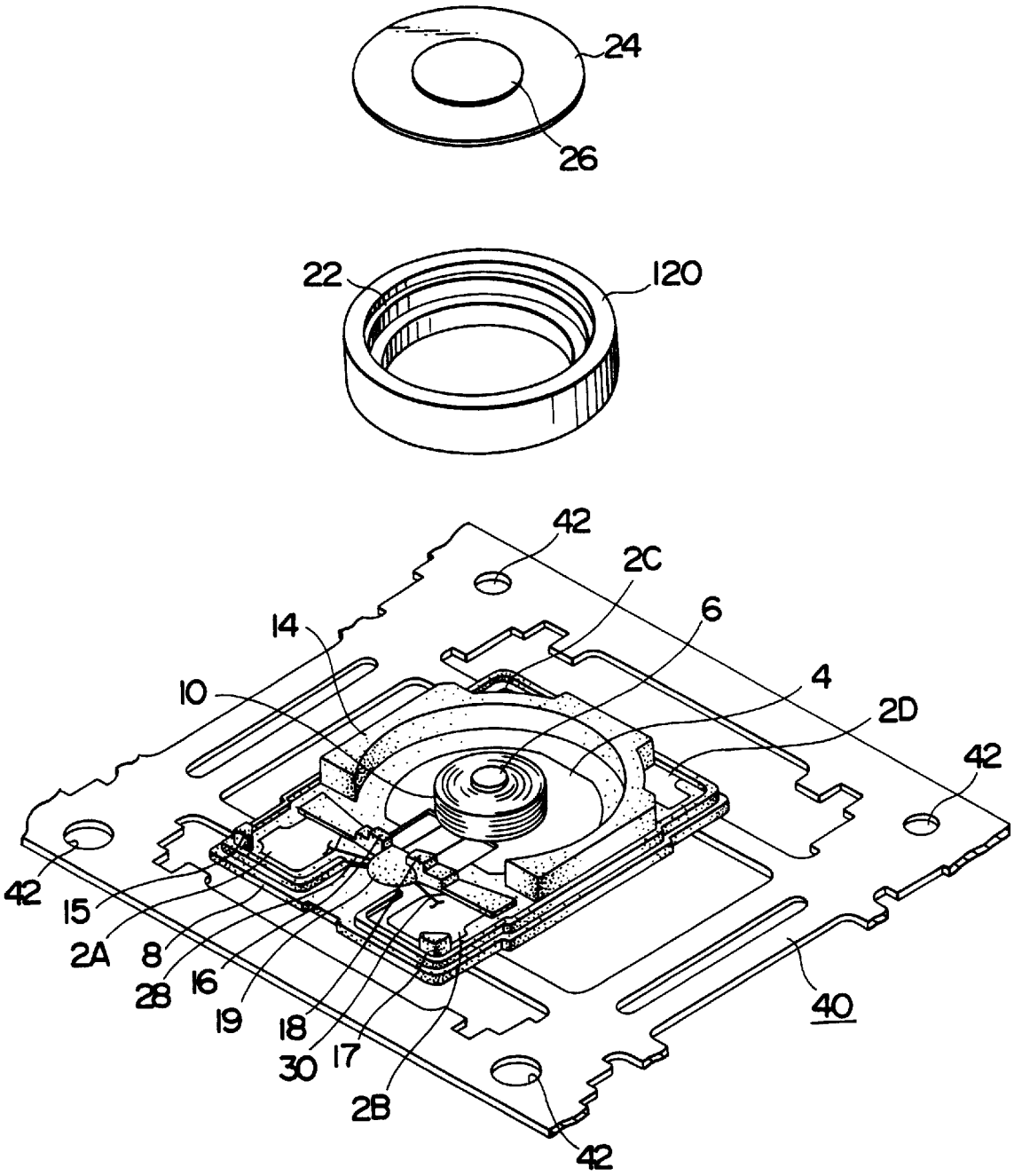
FIG. 15 is an exploded perspective view of an electroacoustic transducer fabricated by a method in accordance with a second embodiment according to the present invention.
Figure 16:
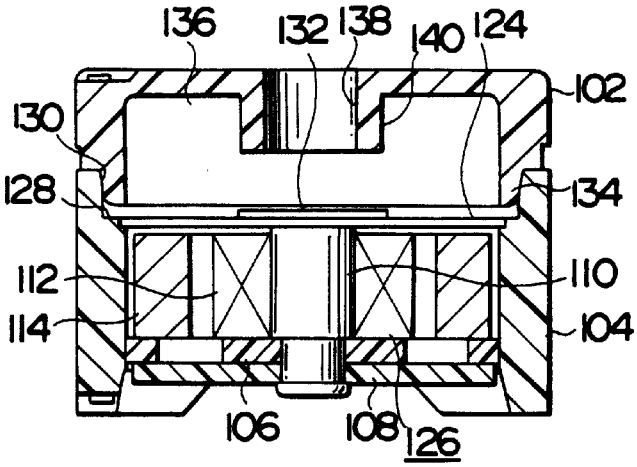
FIG. 16 PRIOR ART
FIG. 16 is a longitudinal sectional view of a conventional electroacoustic transducer.
Figure 17:
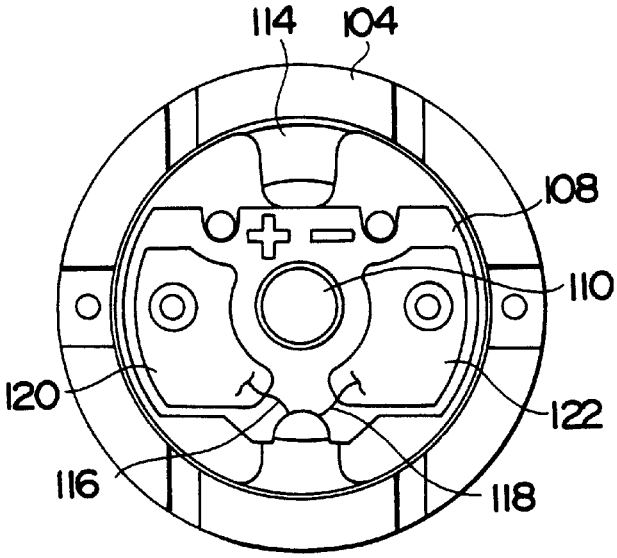
FIG. 17 PRIOR ART
FIG. 17 is a bottom view of the electroacoustic transducer of FIG. 16.

Although the support ring 20 and the magnet 12 are formed separately in the first embodiment, a magnet 120 constituting a support ring may be formed of a plastic magnet or a metal magnet or the like as shown in FIG. 15. The magnet 120 has the stepped portion 22 like the support ring 20 so as to place the diaphragm 24 thereon. If the magnet 120 serving as the support ring 20 is used, it is possible to constitute the magnet 12 and support ring 20 as mentioned in the first embodiment by a single component, which reduces dimensional error caused by two components and enhances accuracy of the product.

The present invention has the following effects as mentioned above.

a. Since the bases are formed on the lead frame by molding and the pole piece portions can be integrated with the bases by the same molding, it is possible to perform continuous operation starting from mounting to assembling of the component parts on the lead frame. Further, since the lead frame need not be reversed, the fabricating steps can be simplified and accuracy of assembly of the product can be enhanced.

b. Since the lead frame may be formed of a strip of material and intervals between products can be assured on the continuous lead frame, and the plural products can be subjected to an automatic assembling process when the lead frame is carried, fabricating time can be shortened, the number of carriage of the products by a pallet can be reduced, and working areas involved in assembling and molding processes can be reduced so as to enhance productivity of the electroacoustic transducer.

c. If the support ring is made of the magnet, the number of component parts can be reduced, the number of components and dimensional error caused by two components can be reduced, and further the accuracy of product can be enhanced.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of fabricating an electroacoustic transducer for converting electric input signals into sound, said method comprising steps of:

forming pole piece portions;

forming a lead frame having a plurality of base forming areas thereon, each of said areas having lead terminals formed therein;

forming bases of a synthetic resin on said lead frame by molding so that said pole piece portions are embedded in said bases;

mounting a coil on each of said pole piece portions embedded in said bases, surrounding said coil with support ring and magnet sections, and placing a diaphragm on said support ring section to be held thereby;

connecting opposite ends of said coil to said lead terminals;

cutting off said lead terminals from said lead frame;

putting cases on and fixedly joining the same to said bases; and subjecting said cut lead terminals to a forming process.

2. A method of fabricating an electroacoustic transducer for converting electric input signals into sound, said method comprising steps of:

forming pole piece portions;

forming a lead frame having a plurality of base forming areas thereon, each of said areas having lead terminals formed therein;

forming bases of a synthetic resin on said lead frame by molding so that said pole piece portions are embedded in said bases;

mounting a coil on each of said pole piece portions embedded in said bases, surrounding said coil with support ring and magnet sections, and placing a diaphragm on said support ring section to be held thereby;

connecting opposite ends of said coil to said lead terminals;

putting cases on and fixedly joining the same to said bases, said putting being carried out on said lead frame;

cutting off said lead terminals from said lead frame; and subjecting said cut lead terminals to a forming process.

3. A method of fabricating an electroacoustic transducer according to claim 1 or 2, wherein said coil is formed by winding a wire as an individual air-core coil or by directly winding a wire around a core of one of said pole piece portions embedded in said bases on said lead frame.

4. A method of fabricating an electroacoustic transducer according to claim 1 or 2, wherein said support ring and magnet sections are integrally formed from a single magnetic member.

5. A method of fabricating an electroacoustic transducer according to claim 1 or 2, wherein said support ring and magnet sections are separate units.

*6. A method of fabricating an electroacoustic transducer comprising the steps of:*

*forming pole piece portions;*

*forming a lead frame having a plurality of base forming areas thereon, each of said areas having lead terminals formed therein;*

*forming bases of a synthetic resin on said lead frame so that said lead terminals and pole piece portions are embedded in said bases;*

*mounting a coil on each of said pole piece portions embedded in said bases;*

*disposing a diaphragm with a given interval between itself and said pole piece portions;*

*connecting opposite ends of said coil to said lead terminals; and*

*cutting off said lead terminals from said lead frame.*

*7. A method of fabricating an electroacoustic transducer comprising the steps of:*

*forming pole piece portions;*

*forming a lead frame having a plurality of base forming areas thereon, each of said areas having lead terminals formed therein;*

*forming bases of a synthetic resin on said lead frame so that said lead terminals and pole piece portions are embedded in said bases;*

*mounting a coil on each of said pole piece portions embedded in said bases;*

*disposing a diaphragm with a given interval between itself and said pole piece portions;*

*connecting opposite ends of said coil to said lead terminals;*

*putting cases on said bases formed on said lead frame; and*

*cutting off said lead terminals from said lead frame.*

*8. A method of fabricating an electroacoustic transducer according to claim 6, wherein said mounting of a coil is performed by mounting a wound coil or directly winding a wire around each of said pole piece portions on said lead frame.*

*9. A method of fabricating an electroacoustic transducer according to claim 7, wherein said mounting of a coil is performed by mounting a wound coil or directly winding a wire around each of said pole piece portions on said lead frame.*

*10. A method of fabricating an electroacoustic transducer according to claim 6, wherein a magnet is disposed around the periphery of the coil and the magnet supports the diaphragm.*

*11. A method of fabricating an electroacoustic transducer according to claim 7, wherein a magnet is disposed around the periphery of the coil and the magnet supports the diaphragm.*

*12. A method of fabricating an electroacoustic transducer according to claim 6, wherein a support ring is disposed around the periphery of the coil and the support ring supports the diaphragm.*

*13. A method of fabricating an electroacoustic transducer according to claim 7, wherein a support ring is disposed around the periphery of the coil and the support ring supports the diaphragm.*

* * * * *